United States Patent Office 3,276,910
Patented Oct. 4, 1966

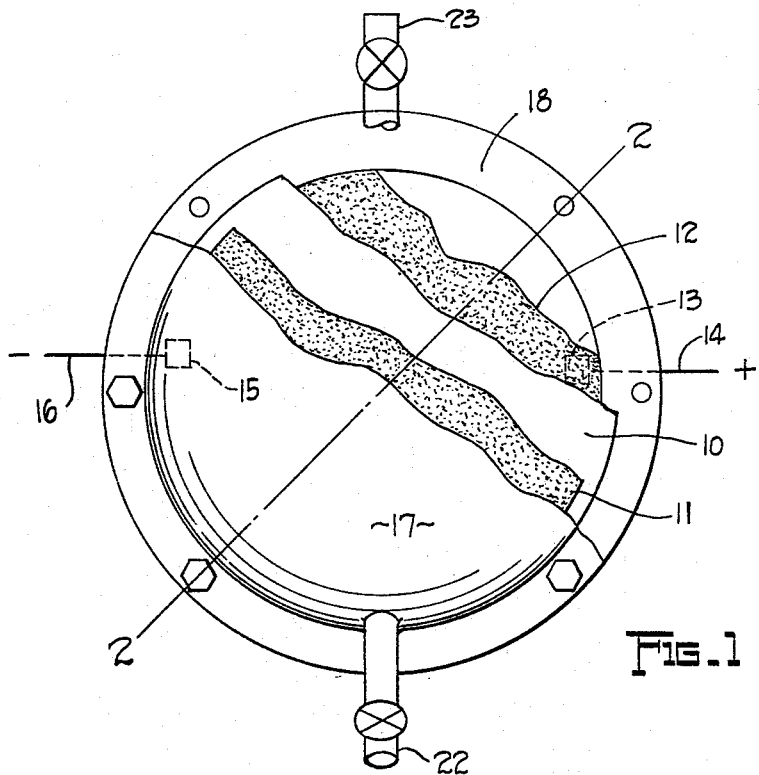
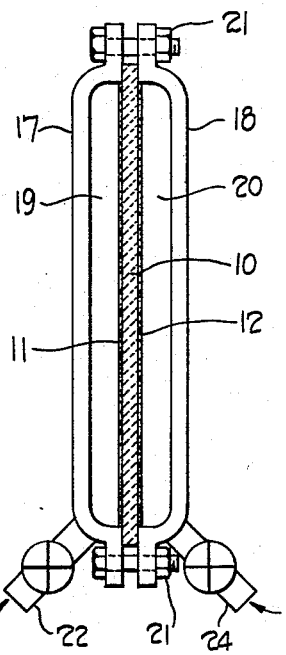
Fig. 1
Fig. 2
INVENTORS.
ROBERT GRASSELLI
JAMES L. CALLAHAN

3,276,910
ION TRANSFER MEDIUM FOR ELECTROCHEMICAL REACTION APPARATUS
Robert Grasselli, Cleveland, and James L. Callahan, Bedford, Ohio, assignors to Standard Oil Company, Cleveland, Ohio, a corporation of Ohio
Filed Oct. 12, 1961, Ser. No. 144,681
5 Claims. (Cl. 136—86)

This invention relates generally to the provision of an improved ion transfer medium for electrochemical reaction apparatus, and more particularly to fuel cells for the direct conversion of one form of energy to another characterized by the presence therein of the improved ion transfer media hereof. The principles of this invention, for exemplary purposes, will be described in reference to a fuel cell for directly converting chemical energy into electrical energy, it being understood, however, that these principles are applicable to other types of electrochemical reaction apparatus as well.

The direct conversion of chemical energy into electrical energy may be accomplished by causing chemical reactions to take place between reactive materials at the junctures between spaced electron conductors and an intermediately disposed ion transfer medium to form a continuous energy exchange system. The reactive materials are separately supplied to each juncture so that the charge exchange of the reaction takes place ionically through the ion transfer medium forming an internal circuit and electronically through the electron conductor forming an external circuit. Thus, where the reactive materials are continuously supplied and an electrical load is coupled to the external circuit, it is possible to electrochemically convert the energy of chemical reaction directly into electrical energy in the external circuit.

By way of example, when hydrogen is employed as one of the materials and oxygen as the other, the oxidation and reduction of each of these materials at the corresponding juncture between the electronic and ionic conductors generates electrical energy in the external circuit and produces water as a product of the reaction. When each of the materials is continuously supplied and consumed within such apparatus, they may be likened, respectively, to a fuel and to an antifuel, the former of which is selected to yield electrons in its chemical reaction and the latter of which is selected to accept electrons.

Normally, in any such apparatus, the fuel and the antifuel are supplied in a relatively stable condition and some means is required for activating their conversion from their normally stable reactant state to their reaction product state. It is believed that such conversion of the fuel and antifuel takes place by means of chemical adsorption to a chemisorbed state, and desorption to the reaction product state at the corresponding junctures between the electrodes and the ion conductors. Such conversion of the fuel and antifuel is not self-motivating and is, therefore, preferably enhanced by the introduction of some means which will promote adsorption at each juncture and some ionic means in the ion transfer medium which will promote desorption at each juncture. The reaction products may be removed from the apparatus in any convenient manner and preferably as they are formed.

For the purpose of this description, the apparatus for accomplishing the direct conversion of chemical energy to electrical energy will be exemplified by a fuel cell. The electron conductors will be identified as electrodes and more specifically as the anode and cathode, respectively, depending on whether they are on the fuel or antifuel side of the cell.

The fuel will be identified throughout as any substance which is oxidizable relative to the antifuel which will in turn be identified as any substance which is reducible relative to the fuel; where oxidation and reduction, respectively, contemplate the release and acceptance of electrons.

A medium which is capable of conducting an electrical charge associated with an atom or a group of atoms, i.e. ions, will be referred to as an ion transfer medium. The ion transfer medium serves to isolate the electronic conductors from each other in the internal circuit. The junctures between the electrodes and the ion transfer medium will be identified throughout as interfaces. The activating means for promoting the conversion of the fuel and antifuel from their reactant state through the chemisorbed state to the reaction product state will be more specifically identified in conjunction with their functional coaction in the cell as an adsorber and a desorber. This overall reaction will be referred to as an electrochemical reaction.

The present invention is primarily concerned with an electrochemical reaction apparatus which is characterized by a substantially solid ion-containing and transfer medium or membrane as distinguished from a liquid medium. In the electrochemical reaction apparatus of the present invention, the electron conducting media are disposed on spaced external surfaces of said solid ion transfer medium and adapted to be exposed, respectively, to the fuel and antifuel. The respective electron conducting media are substantially permeable to the fuel and antifuel, respectively.

It has been found that certain inorganic polymeric salts of the metals of Group IV of the Periodic Table may be used as an ion transfer medium in an electrochemical reaction apparatus when saturated with water or aqueous equilibrium solution. These materials are not substantially affected by the oxidation-reduction conditions of an electrochemical apparatus, are resistant to oxidation, and may be formed into simple compact films or wafers for use between electrodes of such an apparatus. These ion transfer media are especially useful in the intermediate temperature range, i.e. 100–500° C. Specific examples of the metals useful herein include zirconium, titanium, hafnium, thallium, silicon, germanium, cerium, magnesium, aluminum and calcium. The salt forming acids from which the inorganic polymers are made are phosphoric acids and arsenic acids.

Ion transfer media of the inorganic polymeric type are immobile in the sense that the activator ions contained therein are held stationary in the polymer matrix while the moving ions, usually hydrogen ions, are easily moved therethrough. Such media permit compact cell design, prevent dilution of the medium by reaction products, and eliminate water-proofing problems attendant aqueous media. Commercial organic membranes are temperature sensitive at temperatures above 60° C.

To endow these solid inorganic polymers with more flexibility, it has also been found that finely ground rehydrated inorganic polymer may be blended with an oxidation resistant organic polymer such as cross-linked polyethylene, cross-linked polypropylene, poly(tetrafluoroethylene), poly(methylmethacrylate), poly(vinyl chloride), etc.

In still another modification of the the ion transfer media hereof, it is contemplated that such media shall be in the form of a micro porous reticulated inorganic polymeric film.

Briefly stated, then, the present invention relates to an ion transfer medium as a new composition of matter and as a component in an electrochemical reaction apparatus, which ion transfer medium is an inorganic polymeric salt of a metal of Group IV of the Periodic Table, and a phosphoric acid or arsenic acid. These acids are characterized by the higher valent forms of phosphorus or arsenic. A specific example is rehydrated poly(zirconium phosphate).

Certain aspects of this invention may be more readily understood by reference to the annexed drawings in which:

FIG. 1 is a view, partially cut-away, of a fuel cell embodying the principles of the present invention.

FIG. 2 is a cross-sectional view of a fuel cell in accordance herewith taken on the line 2—2 of FIG. 1.

With more particular reference to FIG. 1, which is an illustration of a fuel cell of the present invention partially cut-away on successive surfaces, there is here shown a fuel cell comprising an ion transfer medium 10 which is a physically solid ion-exchange membrane of the present invention. On each of the surfaces of this membrane 10 and in electrical contact therewith, are separate electrodes 11 and 12 deposited on the respective surfaces of the membrane 10 by any suitable physical or chemical means for depositing a permeable metallic film. Terminal 13 is attached to lead 14 which is in turn may be attached to an external circuit, not shown. In like manner, terminal 15 is attached to lead 16 which may be similarly attached to the external circuit. The electrode-membrane-electrode assembly is conveniently encased in a non-conducting envelope, e.g. glass or plastic, composed of covers 17 and 18 defining gas chambers 19 and 20, respectively, and held together by any suitable retaining means such as bolts 21. As shown in FIG. 1, cap 17 is provided with an inlet 22 for the introduction of the fuel reactant material to the exposed surface of the electrode 11, and an outlet 23 for the exhaust of spent gases and any by-products of the electrochemical reaction. The cap 18 is also provided with a gas inlet 24 and similar outlet means, not shown, for contacting the antifuel reactant material with the exposed surface of the electrode 12.

In the device shown in FIG. 1, the electrode 12 is a cathode and is contacted with an antifuel. Electrode 11 is an anode contacted with a fuel.

Where the fuel is hydrogen, hydrocarbon, e.g. propane, or a free-hydrogen-containing gas, and the antifuel is oxygen, or air containing free oxygen, a by-product of the electrochemical reaction within the cell is water. Although some water will be removed from the reaction zone by the sweeping effect of the gases passing through the system via the respective inlets and outlets, a substantial portion of the water formed within the membrane 10 will collect on the edges of the membrane and from time to time drop away from such edges.

As indicated above, the electrode 11 is a porous deposition of a metal, and the electrode 12 is desirably a porous deposition of a different metal. Certain metals are especially acceptive to the adsorption of hydrogen and certain different metals are especially receptive to the adsorption of oxygen. It has been found that the metals platinum, palladium, nickel, cobalt, osmium, iridium, and rhodium are useful on the fuel side of the cell, where the antifuel electrode is composed of either silver or manganese. Thus, in constructing a cell in accordance with the present invention, the fuel electrode may be made of one of the aforementioned metals, and the antifuel electrode is preferably made of either silver or manganese. These electrodes can be produced by chemical reduction of the metal from the metal halide with a reagent such as hydrazine, or by vacuum metallization. The electrodes can be produced in very thin sections and may range in thickness from a few molecules to .005" to 0.010".

The medium through which ions are transferred includes, as above indicated, a physical member in the form of a wafer or film and formed from a polymeric inorganic salt. Salts of certain higher valence group metals, e.g. zirconium, titanium, hafnium, etc. and certain acids, e.g. oxyacids of phosphorus, for example phosphoric acid, pyrophosphoric acid, and certain oxyacids of arsenic, for example, arsenic acid and pyroarsenic, are capable of being produced as polymers. The polymers, in turn are able to be formed, as by pressing, into thin wafers, or casting as films. In either form, they are useful as an ion-transfer medium. The medium is rendered ion conducting by saturating the resulting membrane with water, or aqueous equilibrium solution from the polymer production step.

A preferred polymeric ion transfer medium in accordance herewith is rehydrated poly(zirconium phosphate). This inorganic polymer is conveniently produced by reacting zirconium nitrate with dilute phosphoric acid in 0.1 N HCl solution. Poly(zirconium phosphate) may also be produced by reacting any water soluble zirconium salt with aqueous sodium dihydrogen phosphate in the presence of 0.1 N HCl, or zirconium oxide sol with dilute phosphoric acid in the presence of HCl. Gels having a variety of P:Zr molar ratios may be prepared by varying the relative amounts of phosphate ion and zirconium ion. Thus, materials have been prepared having P:Zr molar ratios ranging from 0.1:1 to 6:1. The zirconium phosphate reaction products are gels which are substantially insoluble in water, and are conveniently separated from the aqueous medium by drying at a temperature which may range anywhere from room temperature up to 200° C. Drying may be effected by air or by means of vacuum.

The gels are conveniently formed by admixing aqueous solutions of the phosphate ion yielding material and the zirconium ion yielding material. For most purposes, the acidic solutions of sodium dihydrogen phosphate, a preferred material or phosphoric acid, also a preferred material, may vary in concentration from 0.01 to about 0.2 molar, and the zirconium aqueous solution from about 0.01 to about 0.1 molar. Addition of the phosphate to the zirconium salt should be slow and the reaction mass vigorously stirred. The resultant gelatinous precipitate is washed, until all of the excess nitrate, or chloride, or phosphate is washed out, then filtered or centrifuged to precipitate the gel and dried. Washing may be effected by decantation using distilled water and until the pH of the solution becomes constant at about 3.4. After drying, the produce is rehydrated with water. At this stage, the resultant product disintegrates upon contact with water. Thereafter, the product is again dried and shaped into the desired wafer or pellet form by any suitable molding means. In order to insure that the product will not disintegrate upon contact with aqueous media, the resultant pellet or wafer is rehydrated with water vapor, e.g. as steam, over a period of from 5 to 15 hours in a humidity cabinet. The relative humidity of the rehydrating atmosphere may range from 30% to 100%. This product which we call "rehydrated poly(zirconium phosphate)" is quite stable to aqueous systems having a pH of less than 7, and especially a pH of 3 or less, and will not disintegrate. Where the contacting aqueous solution is aqueous equilibrium solution from which the zirconium phosphate gel was originally precipitated, the resistance of the pellets is remarkably constant over long periods of time and over a wide temperature range.

It has also been found that the resistances of rehydrated poly(zirconium phosphate) vary from about 120 to about 10 ohms/cm.$^2$/mm. as the P:Zr molar ratio is changed from 0.5 to 1.4. These resistances were measured on the membranes or wafers soaked in their equilibrium liquid. If the wafers are washed for a long period of time in conductivity water, the resistances are observed to increase considerably. Accordingly, it is desirable to utilize the membrane in electrochemical reaction apparatus in the presence of their equilibrium liquids. The conductivities of rehydrated poly(zirconium phosphates) are comparable to those of commercial organic ion-exchange membranes.

Instead of forming the gels into pellets in a die, it is possible to form such wafers by sedimentation from a suspension and subsequent evaporation of the suspending medium.

Films or pellets thus produced are hydrogen ion permeable, and have been demonstrated to be quite stable to hydrolysis as well as stable against attack due to the oxidation-reduction conditions existing when a fuel cell is in operation.

As indicated above, polymeric inorganic materials of various ion permeabilities and structural stabilities are obtained by varying the P:Zr molar ratio of the starting materials. In the preparation of zirconium phosphate it is not necessary to use zirconyl nitrate as one of the reactants as other soluble zirconium salts may be employed equally well.

Another method of forming inorganic polymers useful as ion transfer media in electrochemical reaction apparatus in accordance herewith contemplates the interaction of colloidally dispersed zirconia particles with phosphoric acid or materials which can be hydrolyzed to yield phosphate groups. Films may be prepared in two general ways, either by letting the two reacting substances react directly, or by preforming a zirconia film or wafer and subsequently impregnating it with a substance capable of attaching itself to the internal structure of the zirconia film and capable of yielding phosphate groups which are the core of the ion conduction of the film.

For example, a zirconia film is conveniently made by depositing a very dilute aqueous or aqueous alcohol suspension of zirconia onto a supporting matrix, for example, fiber glass netting, or directly onto an electrode which is to be used in the fuel cell. The deposition is made either by spraying the dispersion onto the heated supporting matrix and/or electrode, whereby the solvent evaporates during the deposition, or a larger quantity of the suspension is brought into contact with the supporting materials and the solvent driven off gradually. Another means is to coat the desired surface, for example, the electrode, by means of a flame spray to deposit a zirconia suspension. Here the suspension is drawn directly into the flame, the solvent evaporates, and the minute particles deposit upon the cooled electrode surface. A particularly strong film with good contact of the electrode surface is obtainable from this latter method.

Still another method contemplates the manufacture of a gel from a zirconia sol and pelletizing it into a wafer.

These procedures result in a structure which is porous and can be impregnated. The impregnation may be done via the vapor phase or via the liquid phase. As impregnating materials, there are used either phosphorus halides which are subsequently hydrolyzed to yield phosphate groups, or one of the phosphoric acids, preferably orthophosphoric acid.

By the methods illustrated above, one obtains a product in which the zirconia sol products touch each other and thus make up the network of the film providing

—O—Zr—O— bridges. By reacting zirconia sol and phosphoric acids together and casting a film or pellet from this mixture in any of the ways above described for the zirconia films, one obtains a more flexible product which is characterized by —O—P—O— bridges. The resultant product is less rigid and more susceptible to hydrolytic breakdown than that produced from zirconia and phosphorus pentachloride, for example.

Instead of a zirconia sol, titania, germania, thoria and tin hydroxide sols may also be employed. Instead of phosphate groups, tungstate or molybdate groups may be introduced into the microporous reticular structure of the film. In any event, precipitation, drying, recontacting with water, redrying, and rehydration with water vapor constitute the preferred steps by which the resultant gel polymer is stabilized to provide a useful membrane material for use in electrochemical reaction apparatus in accordance with the present invention.

Ion permeability of the foregoing materials may be varied by changing the acid to metal ratio, for example, the P:Zr molar ratio.

Other films and wafers useful herein may be made in the same manner as the rehydrated poly(zirconium phosphate) and include poly(zirconium arsenate), rehydrated poly(titanium phosphate), rehydrated poly(titanium arsenate), rehydrated poly(hafnium phosphate), rehydrated poly(germanium phosphate), rehydrated poly(germanium arsenate), rehydrated poly(tin pyrophosphate), rehydrated poly(tin arsenate), rehydrated poly(silicon phosphate), rehydrated poly(thorium phosphate), rehydrated poly(thorium arsenate), rehydrated poly(magnesium phosphate), rehydrated poly(calcium phosphate), rehydrated poly(aluminum phosphate), and the like.

As previously indicated, a fuel cell embodying the principles of this invention may be prepared by pressing or plating appropriate fuel and antifuel electrodes against the two sides of the membrane, wafer or film produced as above described and shown in FIGS. 1 and 2. Thus, nickel, platinum, gold, silver, etc. metals may be used as electrode materials, and the electrodes are preferably of different metals, e.g. platinum for the fuel electrode and silver for the antifuel electrode. The electrode may be water-proofed, if desired, by saturating them with a 5% solution of paraffin wax in benzene and evaporating the benzene solvent. However, with the membranes of the present invention, this is not essential since when the membrane ion transfer medium is prepared as above indicated, the penetration of free acid into the electrode pores is much less than it would be if free aqueous acid solutions were used as the ion transfer medium. There is a slight loss of acid when the ion transfer medium is continuously exposed to a water phase. Accordingly, it is desirable to circulate through the ion transfer medium wafer an equilibrium (or slightly higher) acid solution, e.g. aqueous phosphoric acid, rather than pure water. Any means of keeping the film in contact with such a solution may be employed. To obtain the highest conductivity of ion through the film or wafer medium, it is necessary to provide a liquid phase, e.g. a protonic, or acidic liquid. This avoids a loss of polymer acid from the membrane, and preserves the desirably high hydrogen ion conductivity of the system.

There has thus been provided a new material, rehydrated inorganic polymers, which materials are especially useful as the ion transfer medium in an electrochemical reaction apparatus. In general, these ion transfer media are inorganic polymeric membranes which are salts of a Group IV metal from the Periodic Table, and a salt of an oxyacid of phosphorus or arsenic, for example phosphoric acid or arsenic acid. Such membranes when used in the electrochemical reaction apparatus permit compactness of cell structure due to the thin sections in which they may be made, and the consequent easy stacking of a plurality of cell units. The ion transfer medium being inorganic and polymeric is resistent to hydrolytic and cell component attack. Flooding of the electrodes by ion transfer media is prevented thereby avoiding inactivation of the cell. There has also been provided a method for stabilizing the zirconium phosphate gels to the hydrolytic action of various aqueous solutions.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:

1. In a fuel cell,
a housing comprising two half shells of non-conductive material,
a physically solid plate-like rehydrated ion-exchange membrane of a polymeric salt of a Group IV metal and an acid selected from the group consisting of phosphoric and arsenic acids positioned between said half shells,
means holding said half shells and said ion-exchange membrane together,
said plate-like membrane having opposed surfaces,
a metal selected from the group of platinum, palladium, nickel, cobalt, osmium, iridium, and rhodium on one of said surfaces and forming a porous electrode, a metal selected from the group of silver and copper on the other of said surfaces and forming a porous electrode, means for introducing a gaseous fuel into one of said half shells and into contact with one of said porous electrodes, means for introducing a gaseous oxidant into the other of said half shells and into contact with the other of said electrodes, and separate electrical conductor means connected to each of said electrodes and extending out of said housing.

2. The invention defined in claim 1 wherein the ion-exchange membrane comprises rehydrated poly(zirconium phosphate).

3. In a fuel cell, a housing comprising two half shells, a physically solid plate-like ion-exchange membrane of rehydrated poly(zirconium phosphate) saturated with water, said ion-exchange membrane having opposed surfaces, separate, porous metallic coating electrode means on each of said opposed surfaces, means for introducing a gaseous fuel into one of said half shells and into contact with one of said porous metallic coating electrode means, means for introducing a gaseous oxidant into the other of said half shells and into contact with the other of said porous metallic coating electrode means, and separate electrical conductor means connected to each of said electrode means and extending out of said housing.

4. The invention according to claim 3 wherein the ion-exchange membrane is saturated with aqueous equilibrium solution from which the poly(zirconium phosphate) was originally precipitated, comprising aqueous zirconium nitrate of a concentration in the range from about .01 to about 0.1 molar and an acidic aqueous solution of a material selected from the group of dihydrogen phosphate and phosphoric acid of a concentration in the range from about .01 to about .2 molar.

5. In a fuel cell, a physically solid plate-like rehydrated ion-exchange membrane of a polymeric salt of a Group IV metal and an acid selected from the group consisting of phosphoric acid and arsenic acid, said plate like membrane having opposed surfaces, a metal selected from the group of platinum, palladium, nickel, cobalt, osmium, iridium and rhodium on one of said surfaces and forming a porous electrode, and a metal selected from the group of silver and copper on the other of said surfaces and forming a porous electrode and, means for supplying separately to each of said porous electrodes a separate coacting reactant material.

References Cited by the Examiner

UNITED STATES PATENTS 2,913,511   11/1959   Grubb _____ 136—86
3,056,647   10/1962   Amphlett _____ 23—139

OTHER REFERENCES

J.E.S. vol. 104, No. 6, June 1957, pp. 379–385.

WINSTON A. DOUGLAS, *Primary Examiner.*

JOSEPH REBOLD, *Examiner.*

H. FEELEY, *Assistant Examiner.*